United States Patent [19]

Clark et al.

[11] Patent Number: 5,552,487
[45] Date of Patent: Sep. 3, 1996

[54] METHOD FOR POWDER COATINGS

[75] Inventors: Peter D. Clark, Hartland; Cynthia A. Stants, Pinckney; Richard J. Foukes, Utica, all of Mich.

[73] Assignee: BASF Corporation, Southfield, Mich.

[21] Appl. No.: 434,696

[22] Filed: May 4, 1995

Related U.S. Application Data

[62] Division of Ser. No. 239,670, May 9, 1994, Pat. No. 5,508,349.

[51] Int. Cl.⁶ .................................................. B05D 1/04
[52] U.S. Cl. .................... 525/131; 427/458; 427/532; 525/329.9; 525/330.5; 525/403; 525/437
[58] Field of Search .................................. 525/131, 384, 525/403, 437; 427/458, 532

[56] References Cited

U.S. PATENT DOCUMENTS

| | | | |
|---|---|---|---|
| 3,991,132 | 11/1976 | Siwiec et al. | 526/56 |
| 4,374,954 | 2/1983 | Labana et al. | 525/386 |
| 4,683,271 | 7/1987 | Lin et al. | 525/403 |
| 4,824,909 | 4/1989 | Togo et al. | 525/131 |
| 5,021,297 | 6/1991 | Rhue et al. | 428/430 |
| 5,055,524 | 10/1991 | Pettit, Jr. et al. | 525/172 |
| 5,212,245 | 5/1993 | Franks et al. | 525/223 |
| 5,280,072 | 1/1994 | Wamprecht et al. | 525/131 |

*Primary Examiner*—Bernard Lipman
*Attorney, Agent, or Firm*—Anne Gerry Sabourin

[57] ABSTRACT

The present invention relates to a thermoset powder coating composition and method of application. The coating includes a copolymer having a reactive functionality selected from the group consisting of epoxy, carboxy, and hydroxy functionalities and mixtures thereof, a suitable crosslinking agent capable of reaction with the reactive functionality on the copolymer, and an aliphatic or aromatic crystalline, hydroxyl containing compound having a melting point of between 30° C. and 150° C. and a flow control agent. The powder coating is a pigmented or clear coat powder composition applied over a primer layer.

22 Claims, No Drawings

METHOD FOR POWDER COATINGS

This is a divisional of application Ser. No. 08/239,670 filed on May 9, 1994 now U.S. Pat. No. 5,508,349.

FIELD OF THE INVENTION

The present invention relates to thermosetting powder coatings and to methods for coating substrates with the powder coating compositions. More particularly, the invention relates to the use of reactive flow agents in thermosetting powder coatings and to methods for coating substrates with these powder coatings.

BACKGROUND OF THE INVENTION

Powder coating compositions are advantageous as they have very low volatile organic content and give off very little volatile material to the environment when cured.

In the preparation of powder coatings problems are often encountered in flow and leveling. Flow is the resistance to movement by a liquid material. Leveling is the measure of the ability of a coating to flow out after application so as to obliterate any surface irregularities such as orange peel, peaks or craters produced by the mechanical process of applying or coating. Often when flow and leveling are improved, application characteristics such as sprayability, fluidization and impact fusion are affected detrimentally. The present invention is directed to improving flow and leveling without adversely affecting application characteristics.

SUMMARY OF THE INVENTION

The present invention relates to the use of a hydroxyl containing aliphatic or aromatic crystalline compound, having a melting point between 30° C. and 150° C. as a flow control agent in conjunction with conventional flow control agents in thermoset powder coating compositions. The powder coating is a pigmented or clear coat powder composition and is preferably applied over cured electrocoat. The coating composition includes a polymeric resin comprising a copolymer having a reactive functionality selected from the group consisting of epoxy, carboxy, and hydroxy functionalities and mixtures thereof, and a suitable crosslinking agent capable of reaction with the reactive functionality on the copolymer.

The present invention also provides a method of coating a metal substrate with the coating composition comprising the steps of a) electrodepositing a primer layer on the surface of the metal substrate and b) applying a thermosetting layer of the powder coating composition described above over the previously applied electrodeposited primer layer and c) curing both layers either simultaneously or curing the electrodeposited layer before application of the thermosetting layer and then curing the thermosetting layer.

The use of the aliphatic or aromatic crystalline compound described above, in combination with one or more additional flow agents in a powder coating composition reduces the viscosity of the overall system and aids in coalescing the film. The resulting cured film demonstrates a marked reduction in orange peel formation and consequently, improved film smoothness.

DETAILED DESCRIPTION OF THE INVENTION

The present invention is directed to the use of a hydroxyl containing aliphatic or aromatic crystalline compound having a melting point between 30° C. and 150° C., as a flow control and leveling agent in conjunction with conventional flow control agents for use in thermoset powder coating compositions. Examples of suitable crystalline compounds include trimethylolpropane (TMP), neopentyl glycol, 2,5 dimethyl-2,5-hexanediol, 2,4,6-triphenylphenol, 2, 2' biphenol, 9-phenanthrol and p-cresol. The crystalline compound is used in amounts between 0.05 and 10.0% by weight, based on the total coating composition weight, preferably in amounts between 0.5% and 5.0% by weight based on total coating composition weight. The crystalline compound is useful in thermoset powder coatings including a copolymer having one or more reactive functionalities and a crosslinking agent capable of reacting with the reactive functionality on the copolymer.

Polymeric resins useful for the present invention include polyester, acrylic and epoxy resins. Useful polyester resins are obtained by condensation polymerization reaction between a saturated poly-basic acid or its anhydride and a polyalcohol. Examples of dibasic acids and acid anhydrides for this purpose include phthalic acid, phthalic anhydride, isophthalic acid, terephthalic acid, hexahydrophthalic anhydride, tetrachlorophthalic anhydride, hexahydrophthalic anhydride, pyromellitic anhydride, succinic acid and adipic acid. Examples of useful polyols are ethylene glycol, diethylene glycol, triethylene glycol, propylene glycol, dipropylene glycol, glycerin, trimethylolpropane, pentaerythritol, neopentyl glycol and hydrogenated hisphenol A.

Crosslinking agents for the polyester resins include acid anhydrides, such as pyromellitic anhydride, trimellitic anhydride, phthalic anhydride, and succinic anhydride; aminoplasts such as hexamethoxymethylolmelamine, trimethylolmelamine trimethyl ether, hexamethylolmelamine hexamethyl ether, hexamethylolmelamine and trimethylolbenzoguanamine; glycol urils; and blocked aliphatic and aromatic diisocyanates, such as blocked hexamethylene diisocyanate, blocked isophorone diisocyanate and blocked polymethylene polyphenyl-isocyanate.

Examples of epoxy resins include bisphenol A type epoxy resin, a novolac epoxy resin or an alicyclic epoxy resin. Crosslinking agents for the epoxy resins include dicyandiamide and its derivatives; acid anhydrides such as phthalic anhydride, trimellitic anhydride, pyromellitic anhydride, hexahydrophthalic anhydride, maleic anhydride and succinic anhydride; aromatic diamines such as ethylenediamine, metaphenylenediamine, 4-4'-diaminodiphenylmethane, 4,4'-diamino-diphenyl sulfone and 4,4'-diaminodiphenyl ether; imidazole and dihydrazide.

Examples of suitable acrylic polymers for purposes of the present invention are well known in the art, and can be prepared by polymerizing copolymerizable monomers with other functional group-containing monomers. Suitable copolymerizable monomers include olefinic unsaturated monomers such as ethylene, propylene and isobutylene, aromatic monomers such as styrene, vinyltoluene and α-methyl styrene, esters of acrylic acid and methacrylic acid with alcohols having 1 to 18 carbon atoms such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, cyclohexyl acrylate, cyclohexyl methacrylate, 2-ethylhexyl acrylate, 2-ethylhexyl methacrylate, lauryl acrylate and lauryl methacrylate, vinyl esters of carboxylic acids having 2 to 11 carbon atoms such as vinyl acetate, vinyl propionate and vinyl 2-ethylhexylacrylate and other co-monomers such as vinyl chloride, acrylonitrile and methacrylonitrile. These co-monomers can be used singly or as a mixture of two or more of them. Suitable functional group containing monomers are described as follows.

For example, hydroxy-functional acrylic polymers are formed by reaction of the copolymerizable monomer with hydroxyethyl acrylate, hydroxybutyl acrylate, hydroxybutyl methacrylate, hydroxypropyl acrylate and the like. Amino functional acrylic monomers would include t-butylaminoethyl methacrylate and t-butylaminoethylacrylate. For purposes of the present invention, preferred hydroxy functional acrylic resins have a molecular weight of between 10,000 and 50,000.

Epoxy functional groups are incorporated into the acrylic polymer by reaction with monomers having epoxy functional groups such as glycidyl acrylate, glycidyl methacrylate, allyl glycidyl ether.

Carboxy functional groups are incorporated into the acrylic polymer by reaction with acrylic acid, methacrylic acid, itaconic acid, maleic acid, fumaric acid, and monoesters of maleic acid and fumaric acid with monohydric alcohols.

For purposes of the present invention, hydroxy functional acrylic resins are crosslinked by the aminoplasts described above as useful for polyesters. Other useful crosslinkers include blocked diisocyanates, formed by reacting a blocking agent with diisocyanates including isophorone diisocyanate, the isocyanurate of hexamethylene diisocyanate, toluene diisocyanate, methylene diphenyl diisocyanate, methylene dicyclohexyl diisocyante, 2-methyl- 1,5-pentane diisocyanate, 2,2,4-trimethyl-1,6-hexane diisocyante and 1,12-dodecane diisocyanate.

Preferable blocking agents for reaction with the diisocyanates are oximes, such as methylethyl ketoxime, methyl-n-amyl ketoxime, acetone oxime, cyclohexanone oxime and caprolactam. Other blocking agents include malonic esters and any suitable aliphatic, cycloaliphatic, aromatic and alkyl monoalcohols. Additional blocking agents include the lower aliphatic alcohols such as methyl, ethyl, chloroethyl, propyl, butyl, amyl, hexyl, heptyl, octyl, nonyl, 3,3,5-trimethylhexanol, decyl and lauryl alcohols, and the like. Examples of aromatic-alkyl alcohols, include phenylcarbinol, ethylene glycol monoethyl ether, monobutyl ether, monopropyl ether and the like. Other blocking agents are phenolic compounds such as phenol itself and substituted phenols where the substituents do not adversely affect the coating operations including cresol, nitrophenol, chlorophenol and t-butyl phenol. Also suitable are dibutyl amine and tertiary hydroxyl amines such as diethylethanolamine.

The blocked diisocyanate crosslinkers of the present invention are formed by reacting sufficient quantities of organic polyisocyanates, with sufficient quantities of blocking agent, at a sufficient temperature, for a sufficient amount of time, under reaction conditions conventional in the art, such that no free isocyanate groups are present when the reaction has run its course.

Generally, the blocked crosslinkers are available commercially. Preferred crosslinkers for purposes of the present invention include the blocked isocyanurate of isophorone diisocyanate, available as and the blocked isocyanurate of hexamethylene diisocyanate.

Where the functional radicals of the resin are carboxyl, the cross-linking agent may be selected from the group consisting of di-epoxy compounds, polyoxazolines and polydioxanes.

Where the functional radicals of the resin are glycidyl, examples of suitable crosslinking agents are polycarboxylic acids and their anhydrides such as phthalic acid, phthalic anhydride, trimellitic anhydride and pyromellitic anhydride; polyphenols such as catecol, resorcinol, hydroquinone, pyrogallol and fluoroglumine; and polyamines such as ethylenediamine, metaphenylenediamine, 4-4'-diaminodiphenylmethane, 4,4'-diamino-diphenyl sulfone and 4,4'-diamino-diphenyl ether.

The polymeric resin is utilized in an amount between 90 and 10 % by weight, and preferably in an amount between 60 and 20% by weight, based on total coating composition weight. The crosslinking agent is utilized in amounts between 10 and 90% by weight, and preferably in amounts between 20 and 50% by weight, based on total coating composition weight.

In addition to the polymeric resin and crosslinking agent, additives including pigments, fillers, thickeners, plasticizers, flow additives, hindered amine light stabilizers and ultraviolet light absorbers may also be added.

Pigments are utilized in amounts between 0 and 35% by weight, based on total coating composition weight. Other additives comprise between 5 to 30%, preferably 10 to 25% by weight, based on total coating composition weight.

The thermosetting powder coating compositions can be prepared by melt blending the ingredients of the coating compositions. This can be accomplished by first dry blending the ingredients in a planetary mixer and then melt blending the admixture in an extruder at a suitable temperature within the range of from 80° C. to 130° C. The extrudate is then cooled and pulverized into a particulate blend.

The thermosetting powder coating composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of from 1.0 to 8 mils.

The substrate can optionally be preheated prior to application of a powder coating composition to promote uniform and thicker powder deposition.

A pigmented powder primer-surfacer composition can be applied directly upon bare metal, e.g., upon untreated, unprimed steel, or upon pretreated, i.e., phosphatized unprimed steel. The primer-surfacer coating compositions can also be applied upon phosphatized steel having a thin (1.0 to 2.0 mil) layer of an electrodeposited primer, cured or uncured before the application of the powder coating compositions. In the preferred embodiment, the primer-surfacer is applied over a cured electrodeposited primer coating upon the metal substrate. After application of the powder primer-surfacer, the panels were baked for between 20 and 90 minutes at between 162° and 191° C.

Alternatively, the powder coating composition can be applied directly upon an uncured electrodeposited primer coating and the powder coating layer can be co-cured by heating at temperatures between 149° C. and 177° C. for from 10 minutes to 90 minutes.

A non-pigmented powder coating prepared according to the present invention can be applied over the coatings described above. Where desired, applications of basecoat and clearcoat are made and baked for between 25 and 45 minutes at temperatures between 121° and 135° C.

The powder coating compositions of this invention exhibit improved flow characteristics compared to conventional powder coating compositions. In addition, the powder coating compositions of the invention have excellent stability and impact resistance.

After application and curing of the powder coating composition, at least one topcoat layer is applied over the coating layer. The topcoat can be, for example, a polyester-based coating cured with an aminoplast resin, an acrylic polymer-based coating cured with an aminoplast resin, a mixed resinous blend of an acrylic polymer and polyester containing coating cured with an aminoplast resin. The topcoat may be solvent-based, water-based or a powder coating. The topcoat layer may be a composite coating comprising a colored or pigmented basecoat over which is deposited a transparent or clear coat.

The invention is further illustrated by the following examples.

EXAMPLES

Examples 1–9

Primer-Surfacer Powder Coatings

Powder coating compositions were prepared from the ingredients set forth in Table 1 below. The powder coatings were prepared by premixing the ingredients for 30–90 seconds, until homogenous. The premixed blend was then extruded on a ZSK-30 (Werner Pfleider) twin screw extruder at the following conditions.

Zone 1=130° C.
Zone 2=130° C.
RPM=250

The flake was re-extruded at the above conditions. The flake was then ground on an ACM-2L mill to 22–25 microns.

Coatings were applied with an ONODA spray gun, Model No. GX108. Panels were sprayed with the powder coating composition to a thickness of between 1.0 and 8 mils over electrocoated cold rolled steel (CRS). The panels were baked for 30 minutes at 350° F.

Example 10

Clearcoat powder Coating

The clearcoat powder coating is prepared by premixing the ingredients for 30–90 seconds, until homogenous. The premixed blend is then extruded on a ZSK-30 (Werner Pfleider) twin screw extruder at the following conditions.

Zone 1=130° C.
Zone 2=130° C.
RPM=250

The flake is then re-extruded at the above conditions. The flake is then ground on an ACM-2L mill to 22–25 microns.

Coatings are applied with an ONODA spray gun, Model No. GX108, to panels at a thickness of between 1.0 and 8 mils over electrocoated cold rolled steel (CRS). The panels are then baked for 30 minutes at 350° F.

TABLE 1

EXAMPLES 1–10

| INGREDIENT | control 1 | control 2 | 3 | 4 | 5 | 6 | 7 | 8 | 9 | 10 |
|---|---|---|---|---|---|---|---|---|---|---|
| ACRYLIC RESIN[a] | 43.0 | 50.7 | 49.1 | 47.5 | 44.19 | 42.25 | 31.3 | 53.6 | 44.1 | 44.1 |
| BLOCKED NCO[b] | 22.8 | 26.8 | 28.2 | 29.6 | 32.3 | 33.95 | 25.5 | 37.3 | 32.3 | 32.2 |
| AIR RELEASE AGENT[c] | 0.4 | 0.4 | 0.4 | 0.4 | 0.4 | 0.4 | 0.4 | 0.4 | 0.4 | 0.4 |
| PLASTICIZER[d] | 3.0 | 3.0 | 3.0 | 3.0 | 3.0 | 3.0 | 3.0 | 3.0 | 3.0 | 3.0 |
| FLOW ADDITIVE | 3.0[e] | 3.0[e] | 3.0[e] | 3.0[e] | 3.0[e] | 3.0[e] | — | 1.5[f] | 3.0 | 3.0 |
| UV ABSORBER[g] | 2.6 | 2.6 | 2.6 | 2.6 | 2.6 | 2.6 | 1.5 | 4.0 | 0.4 | 0.4 |
| HALS[h] | 1.4 | 1.4 | 1.4 | 1.4 | 1.4 | 1.4 | 2.6 | 2.2 | 2.6 | 2.6 |
| LANCOWAX[i] | 0.4 | 0.4 | 0.4 | 0.4 | 0.4 | 0.4 | — | — | 1.4 | 1.4 |
| WHITE PIGMENT | 11.6 | 11.5 | 11.5 | 11.5 | 11.5 | 11.5 | 32.7 | — | 11.5 | 11.5 |
| BLACK PIGMENT | 0.05 | 0.2 | 0.2 | 0.2 | 0.2 | 0.2 | 0.6 | — | 0.2 | 0.2 |
| TMP[j] | — | — | 0.25 | 0.5 | 1.0 | 1.3 | 1.0 | 1.0 | — | — |
| NPG[k] | — | — | — | — | — | — | — | — | 1.0 | — |
| CHDM[l] | — | — | — | — | — | — | — | — | — | 1.0 |
| FILLER[k] | 11.75 | — | — | — | — | — | — | — | — | — |

[a]Hydroxy functional acrylic resin.
[b]Caprolactam blocked isophorone diisocyanate.
[c]Uraflow ® B, available from GCA Chemical, Bradenton, Florida 34205.
[d]Acid functional acrylic resin, available as SCX-819, from S. C. Johnson and Son, Racine, Wisconsin 53403.
[e]Amide modified polymeric ester sold under the trademark Powdermate ®, available from Troy Corp., East Hanover, New Jersey 07936.
[f]A copolyacrylate sold under the trademark Perenol ® f30P, available from Henkel Corp., Ambler, Pennsylvania 19002.
[g]Tinuvin ® 900, uv light absorber, available from Ciba Geigy Corp., Ardsley, New York 10502.
[h]Tinuvin ® 144, hindered amine light stabilizer, available from Ciba Geigy Corp., Ardsley, New York 10502.
[i]Lancowax ® PPB62D, a paraffin wax, available from Cray Valley Products, Stuyvesant, New York 12173.
[j]Trimethylolpropane
[k]Baramite, a clay filler from Cyprus Foote Mineral Co., Malvern, Pennsylvania 19335.
[l]Neopentylglycol
[m]Cyclohexyldimethylol

Examples 11–14

Powder coating compositions are prepared from the ingredients set forth in Table 2 below. The powder coatings are prepared by premixing the ingredients for 30–90 seconds, until homogenous. The premixed blend is then extruded on a ZSK-30 (Werner Pfleider) twin screw extruder at the following conditions.

Zone 1=130° C.
Zone 2=130° C.
RPM=250.

The flake is then re-extruded at the above conditions. The flake is then ground on an ACM-2L mill to 22–25 microns.

Coatings are applied with an ONODA spray gun, Model No. GX108. Panels are sprayed with the powder coating composition to a thickness of between 1.0 and 8 mils over electrocoated cold rolled steel (CRS). The panels are baked for 30 minutes at 350° F.

TABLE 2

Examples 11–14

| Ingredient | 11 | 12 | 13 | 14 |
|---|---|---|---|---|
| ACRYLIC RESIN[a] | 44.1 | 44.1 | 44.1 | 44.1 |
| BLOCKED NCO[b] | 32.2 | 32.2 | 32.2 | 32.2 |
| AIR RELEASE AGENT[c] | 0.4 | 0.4 | 0.4 | 0.4 |
| PLASTICIZER[d] | 3.0 | 3.0 | 3.0 | 3.0 |
| FLOW ADDITIVE[e] | 3.0 | 3.0 | 3.0 | 3.0 |
| UV ABSORBER[f] | 0.4 | 0.4 | 0.4 | 0.4 |
| HALS[g] | 2.6 | 2.6 | 2.6 | 2.6 |
| LANCOWAX[h] | 1.4 | 1.4 | 1.4 | 1.4 |
| WHITE PIGMENT | 11.5 | 11.5 | 11.5 | 11.5 |
| BLACK PIGMENT | 0.2 | 0.2 | 0.2 | 0.2 |
| p-Cresol | 1.0 | — | — | — |
| 2,4,6 Triphenylphenol | — | 1.0 | — | — |
| 2,2'Biphenol | — | — | 1.0 | — |
| 9-Phenanthrol | — | — | — | 1.0 |

[a]Hydroxy functional acrylic resin.
[b]Caprolactam blocked isophorone diisocyanate.
[c]Uraflow ® B, available from GCA Chemical, Bradenton, Florida 34205.
[d]Acid functional acrylic resin, available as SCX-819, from S. C. Johnson and Son, Racine, Wisconsin 53403.
[e]Amide modified polymeric ester sold under the trademark Powdermate ®, available from Troy Corp., East Hanover, New Jersey 07936.
[f]Tinuvin ® 900, uv light absorber, available from Ciba Geigy Corp., Ardsley, New York 10502.
[g]Tinuvin ® 144, hindered amine light stabilizer, available from Ciba Geigy Corp., Ardsley, New York 10502.
[h]Lancowax ® PPB62D, a paraffin wax, available from Cray Valley Products, Stuyvesant, New York 12173.

TABLE 3

Physical Properties of Cured Powder Films

| EXAMPLE | PEEL @ 2.0 MILS FILM | GRAVELOMETER | GAS INVERSION | GAS DIP | SOLVENT RESISTANCE |
|---|---|---|---|---|---|
| Control 1 | 7 | 7+ | p | | 0 |
| Control 2 | 8 | 7+ | p | | 1 |
| 3 | 8 | 7+ | p | p | 1 |
| 4 | 8 | 7+ | p | p | 1 |
| 5 | 8/9 | 7+ | p | p | 1 |
| 6 | 8/9 | 7+ | p | p | 1 |
| 7 | 8 | 7+ | p | p | 0 |
| 9 | 8/9 | — | p | p | 0 |
| 10 | 8/9 | — | p | p | 0 |

We claim:

1. A method of coating a substrate with a thermoset powder coating composition comprising the steps of I) electrodepositing a primer layer on the surface of a metal substrate and II) applying over the previously applied electrodeposited primer layer, a layer of thermosetting powder coating composition including
   a) a film-forming resinous binder including
      i) a copolymer selected from the group consisting of epoxy, polyester, and acrylic copolymers having a reactive functionality selected from the group consisting of epoxy, carboxy, and hydroxy functionalities and mixtures thereof and
      ii) a crosslinking agent capable of reacting with the reactive functionality on the copolymer selected from the group consisting of aminoplasts, blocked aliphatic diisocyanates and blocked aromatic diisocyanates, polycarboxylic acids, acid anhydrides, dicyandiamide and its derivatives, polyphenols, polyamines, glycol urils, and mixtures thereof,
   b) a first flow control agent which is an aliphatic or aromatic crystalline hydroxyl containing compound having a melting point between 30° C. and 150° C., and
   c) a second flow control agent, different from the first flow control agent and III) curing both the primer layer and the thermosetting powder coating layer, by baking at a temperature above the melting point of the first flow control agent.

2. The method of claim 1 wherein the primer layer and thermosetting powder coating layer are cured simultaneously.

3. The method of claim 1 wherein the primer layer is cured before application of the thermosetting layer and then the thermosetting layer is applied and cured.

4. The method of claim 1, wherein the thermosetting powder coating composition applied in step (II) further comprises additive ingredients selected from the group consisting of pigments, anti-oxidants, cure catalysts and degassing agents and mixtures thereof, wherein the additives and flow control agents are present in a total amount of between 5.0 and 30.0% by weight, based on the total coating composition weight.

5. The method of claim 1, wherein the thermosetting powder coating composition applied in step (II) includes the crystalline compound (b) selected from the group consisting of trimethylolpropane, neopentyl glycol, 2,5 dimethyl-2,5-hexanediol, 2,4,6-triphenylphenol, 2, 2' biphenol, 9-phenanthrol and p-cresol, in an amount between 0.05 and 10% by weight.

6. The method of claim 1, wherein the thermosetting powder coating composition includes the first flow control agent in an amount between 0.25% and 5.0% by weight based on total coating composition weight.

7. The method of claim 1, wherein the thermosetting layer obtained by step II) is from 2 to 15 mils thick.

8. The method of claim 1, wherein the thermosetting powder coating composition applied in step II) includes copolymer i) in an amount between 20 and 60 percent by weight based on total coating composition weight and crosslinking agent ii) in an amount between 20 and 50 percent by weight based on total coating composition weight.

9. The method of claim 1, wherein the thermosetting powder coating composition applied in step II) includes pigment in an amount up to 35 percent by weight.

10. The method of claim 1, wherein the thermosetting powder coating composition applied in step (II) includes the crystalline compound (b) in an amount between 0.05 and 10.0% by weight based on total coating composition weight.

11. The method of claim 1, wherein the thermosetting powder coating applied in step (II) comprises as the copolymer a hydroxy functional acrylic copolymer.

12. The method of claim 1, wherein the thermosetting powder coating applied in step (II) comprises a crosslinking agent selected from the group consisting of aminoplast crosslinkers and blocked aliphatic and aromatic diisocyanate crosslinkers.

13. A method of coating a substrate with a thermoset powder comprising

A) applying to a substrate a layer of a thermosetting powder coating composition including
  a) a film-forming resinous binder including
    i) a copolymer selected from the group consisting of epoxy, polyester, and acrylic copolymers having a reactive functionality selected from the group consisting of epoxy, carboxy, and hydroxy functionalities and mixtures thereof and
    ii) a crosslinking agent selected from the group consisting of aminoplasts, blocked aliphatic diisocyanates and blocked aromatic diisocyanates, polycarboxylic acids, acid anhydrides, dicyandiamide and its derivatives, polyphenols, polyamines, glycol urils, and mixtures thereof,
  b) a first flow control agent which is an aliphatic or aromatic crystalline hydroxyl containing compound having a melting point between 30° C. and 150° C., and
  c) a second flow control agent, different from the first flow control agent and III) curing both the powder coating layer by baking, at a temperature above the melting point of the first flow control agent.

14. The method of claim 13, wherein the first flow control agent (b) is selected from the group consisting of trimethylolpropane, neopentyl glycol, 2,5 dimethyl-2,5-hexanediol, 2,4,6-triphenylphenol, 2, 2'biphenol, 9-phenanthrol and p-cresol.

15. The method of claim 13, wherein the first flow control agent is present in an amount between 0.05 and 10% by weight.

16. The method of claim 13, wherein first flow control agent is present in an amount between 0.25% and 5.0% by weight based on total coating composition weight.

17. The method of claim 13, wherein the thermosetting powder coating composition includes copolymer i) in an amount between 20 and 60 percent by weight based on total coating composition weight and crosslinking agent ii) in an amount between 20 and 50 percent by weight based on total coating composition weight.

18. The method of claim 13, wherein the powder coating composition comprises a clearcoat coating composition.

19. The method of claim 18, wherein the clearcoat coating composition is applied over an electrocoated and primer coated substrate.

20. A method for improving flow and leveling of a powder coating composition comprising A) forming a mixture by combining
  a) a film-forming resinous binder including
    i) a copolymer selected from the group consisting of epoxy, polyester, and acrylic copolymers, having a reactive functionality selected from the group consisting of epoxy, carboxy, and hydroxy and functionalities and mixtures thereof and
    ii) a crosslinking agent selected from the group consisting of aminoplasts, blocked aliphatic diisocyanates and blocked aromatic diisocyanates, polycarboxylic acids, acid anhydrides, dicyandiamide and its derivatives, polyphenols, polyamines, glycol urils, and mixtures thereof,
  b) a first flow control agent which is an aliphatic or aromatic crystalline hydroxyl containing compound having a melting point between 30° C. and 150° C., and
  c) a second flow control agent, different from the first flow control agent;

B) extruding the mixture;

C) pulverizing the extrudate to form a particulate blend of the thermoset powder coating composition;

D) applying the powder coating composition to a substrate and

E) curing the coating composition by baking at temperatures above the melting point of the first flow control agent.

21. The method of claim 20 wherein the first flow control agent is present in an amount between 0.05 and 10% by weight.

22. The method of claim 20 wherein the flow control agent is selected from the group consisting of trimethylolpropane, neopentyl glycol, 2,5 dimethyl-2,5-hexanediol, 2,4,6-triphenylphenol, 2, 2' biphenol, 9-phenanthrol and p-cresol.

* * * * *